RADIO AID TO NAVIGATION

Filed Dec. 31, 1947 2 SHEETS—SHEET 1

Inventor:
David G.C.Luck
By J. L. Whittaker
ATTORNEY

Inventor:
David G. C. Luck
By J. L. Whittaker
ATTORNEY

Patented Feb. 5, 1952 2,584,599

UNITED STATES PATENT OFFICE 2,584,599

RADIO AID TO NAVIGATION

David G. C. Luck, Princeton, N. J., assignor to Radio Corporation of America, a corporation of Delaware Application December 31, 1947, Serial No. 794,937

3 Claims. (Cl. 178—6.8)

This invention relates to radio aids to navigation, and its principal object is to provide improvements in course-defining systems such as ranges and localizers.

Certain more or less comprehensive radio navigation systems have been devised involving television links between ground stations and the craft to be directed or guided; one of the more specific objects of the present invention is to provide a course-defining system which utilizes some of the equipment required for such television links.

Ordinarily, instrument landing systems or ground approach systems for aircraft require a beacon transmitter to be located in line with the runway. This constitutes a hazard even though the beacon is placed well beyond the end of the runway. Accordingly, it is a further object of this invention to provide a radio localizer system in which the beacon is located off the line of the runway.

Still another object of this invention is to provide improved methods and means for visually indicating deviation of a mobile craft from a prescribed path or course.

Figures 1, 2, 3:
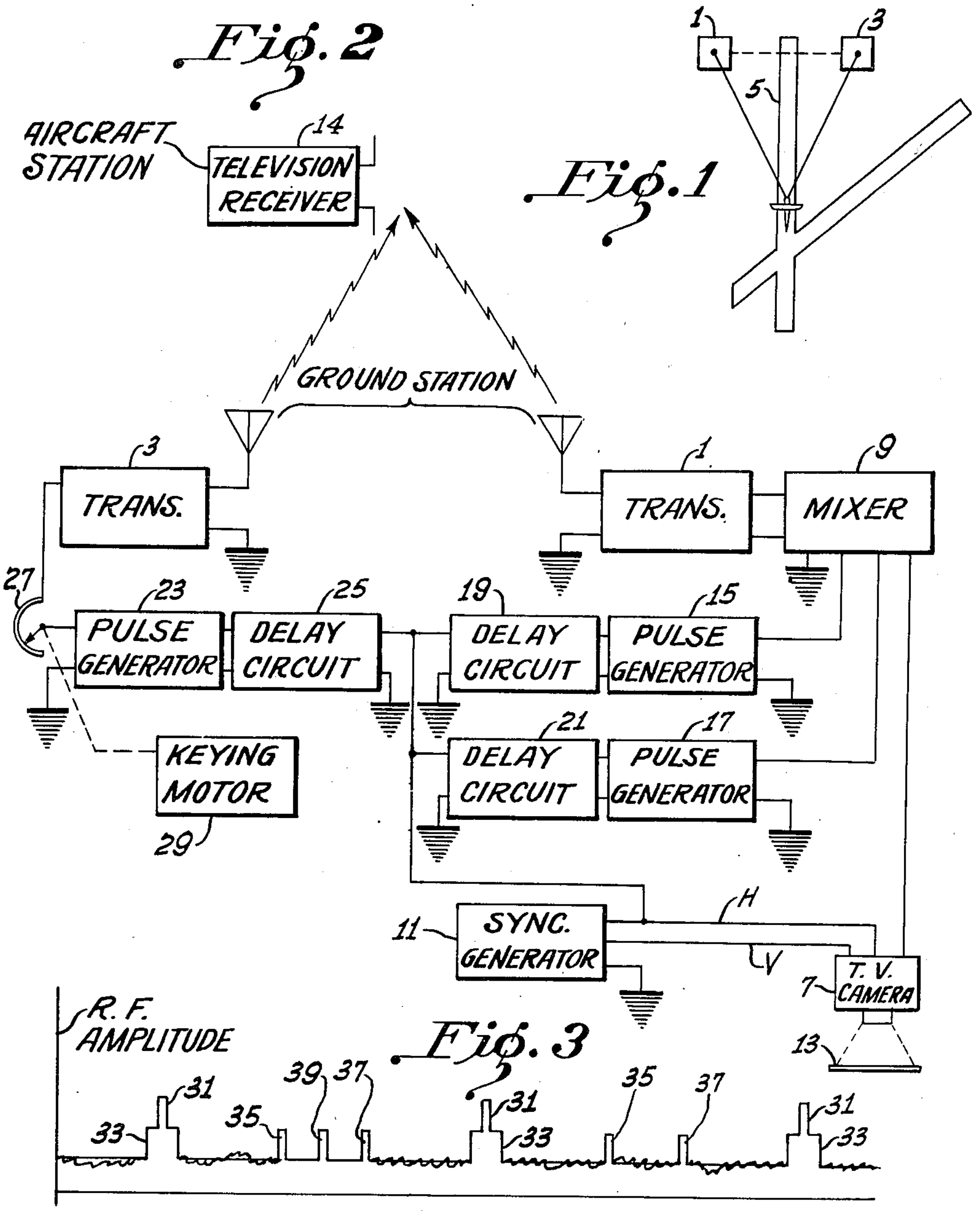
Figure 4:
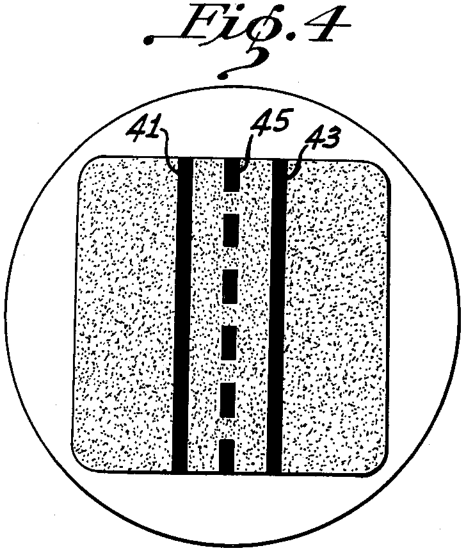
Figure 5:
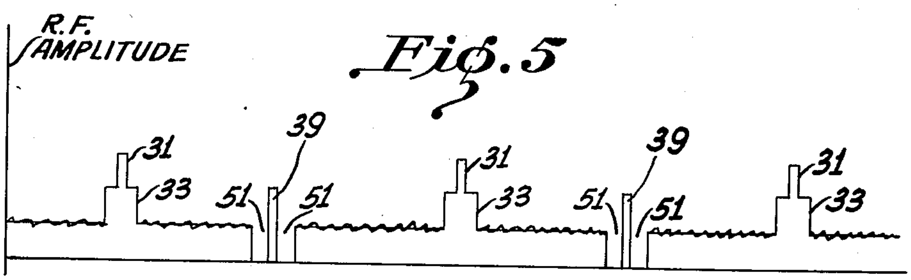
Figure 6:
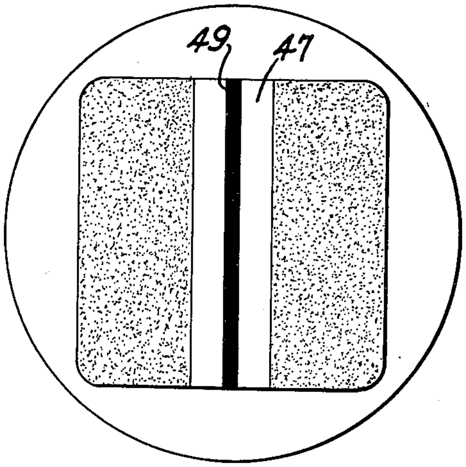

The invention will be described with reference to the accompanying drawings, wherein:

Figure 1 is a plan view of a portion of an airport, showing a landing strip or runway and a localizer system, Figure 2 is a schematic block diagram of a localizer system embodying the present invention, Figure 3 is an oscillogram representing signals produced in one mode of operation of the system of Figure 2, Figure 4 is a pictorial representation of a television display produced in response to the signals shown in Figure 3, Figure 5 is an oscillogram representing signals produced in an alternative mode of operation of the system of Figure 2, and Figure 6 shows a television display of the type produced in response to signals like those of Figure 5.

Refer first to Figure 1, which shows the general arrangement of a localizer system according to this invention. Two transmitters 1 and 3 are located on opposite sides of the landing strip 5, in a line perpendicular to the landing strip and at equal distances therefrom.

The transmitters 1 and 3 may operate on the same carrier frequency. Each aircraft using the present system carries a television receiver designed to respond to both transmitters 1 and 3.

Referring to Figure 2, a television camera 7, such as described in C. V. Bedford Patent 2,237,403, is coupled to the transmitter 1 through a mixer circuit 9. A synchronizing signal generator 11, such as shown in C. V. Bedford Patent 2,258,943, provides line and frame synchronizing pulses which control the scanning circuits in the camera 7 and are applied, together with the video signal output of the camera, to the mixer 9. The mixer may be as shown in R. L. Campbell Patent 2,092,875. Visual information, such as a map, written instructions, weather information, and the like, are displayed on a writing surface 13 disposed in front of the camera 7. A picture of this is sent by way of the transmitter 1, which may be of the general types described in Hansell Patent 2,032,208 or Lindenblad Patent 2,052,888, to all aircraft in the vicinity and may be reproduced on an airborne television receiver 14. The receiver is of conventional type as shown in Carlson Reissue Patent Re. 20,700.

In addition to the television signals from the camera 7, the outputs of two pulse generators 15 and 17 are applied to the mixer 9. The pulse generators 15 and 17 may be blocking oscillators or other known devices, for example, as shown in said Bedford Patent 2,258,943 or as shown in Bedford Patent 2,223,812, designed to have a free-running frequency approximately equal to the line repetition frequency of the television system. Line synchronizing pulses from the sync generator 11 are applied to the pulse generators 15 and 17 through delay circuits 19 and 21 respectively, which may be of the type shown in Bedford Patent 2,145,332.

The transmitter 3, similar to the transmitter 1, is modulated by a third pulse generator 23, similar to the generators 15 and 17 and controlled by line synchronizing pulses from the sync generator 11 through a similar delay circuit 25. The output of the pulse generator 23 is periodically keyed on and off by a switch 27, driven continuously by a motor 29.

The adjustment and operation of the described system may be substantially as follows: The delay circuit 25 is adjusted to excite the pulse generator 23 and to provide a brief pulse substantially midway between each pair of line synchronizing pulses. The delay circuit 19 provides somewhat less delay than the delay circuit 25, causing the pulse generator 15 to produce a brief pulse shortly before each pulse from the generator 23. The delay circuit 21 provides somewhat more delay than the delay circuit 25, thus causing the pulse generator 17 to make a pulse slightly later than each pulse from the generator 23.

Figure 3 shows the time relationship between the various pulses; the line or horizontal synchronizing pulses 31 are superimposed on horizontal blanking pulses 33, as in a conventional television signal. The pulses 35 are those provided by the generator 15, and the pulses 37 represent the output of the generator 17. These signals, and whatever picture signal is present, are transmitted by the transmitter 1. The output of the pulse generator 23 is shown in Figure 3 as the pulse 39, and is transmitted by the transmitter 1 at the center of the interval between the pulses 35 and 37. The pulse 39 is transmitted only when the switch 27 is closed. The amplitudes of the pulses 35, 37, 39 preferably, are equal to the maximum or black video signal amplitude, hence do not actuate the synchronizing signal circuits, while providing suitable contrast with picture elements.

It is assumed for the present that the television system is designed, as in conventional practice in the United States of America, so that the minimum radio frequency signal level represents white in the picture, an intermediate signal level represents black, and sync pulses are at a level "blacker than black." The signal shown in Figure 3 will produce a display, on the screen of the receiver 14, of the type shown in Figure 4. The pulses 35 make a black spot at the same point in each horizontal line, presenting the appearance of a vertical black stripe 41. The pulses 37 produce a similar vertical black line 43. The pulses from the transmitter 3 produce the vertical line 45, which is broken at intervals owing to periodic keying by the switch 27. All of the vertical black lines are superimposed on the picture picked up by the camera 7; with the wave shown in Figure 3, the picture is simply a uniform gray as shown in Figure 4.

As long as the aircraft is on a course directly over the runway and therefore equidistant from both transmitters 1 and 3, the line 45 will appear midway between the lines 41 and 43 in the display provided by the receiver 14. Now suppose the craft gets off course to the left; it will be closer to the transmitter 1 than it is to the transmitter 3, and the pulses 39 will arrive earlier with respect to the pulses 35 and 37. This will cause the dash line 45 of the television display to shift to the left, closer to the line 41 and further from the line 43. Similarly, if the craft is off course to the right, the line 45 shifts to the right with respect to the lines 41 and 43. Thus the system provides a clear, readily interpretable and continuous indication of the lateral position of the aircraft with respect to the desired flight path. It will be apparent that the system will handle simultaneously any practical number of aircraft, each displaying its own indication on its respective television receiver independently of the positions of the others.

The foregoing description of the operation of the system is based on the assumption that dark portions of the television picture are represented by high signal amplitudes, and light portions by low amplitudes. If the opposite type of modulation (so-called "positive") is used, as is standard in Great Britain, the course-indicating lines will appear white rather than black.

The sensitivity of the indication may be increased to any desired degree by increasing the amplitude of the horizontal deflection signal in the receiver 14. This will expand the sweep to show only the central portion of the display of Figure 4, spreading it out to cover the screen. A modified type of display is shown in Figure 6, comprising a broad white stripe 47 down the center of the gray picture, with a narrower black line 49 nominally at the center of the white stripe. This can be produced by omitting the pulse generator 17 from the system of Figure 1 and designing the generator 15 to provide a relatively wide pulse (corresponding to the width of the stripe 47) which is applied to the mixer 9 in such polarity as to modulate the transmitter 1 downward, i. e., in the direction of minimum radio frequency signal amplitude. The line 49 may be made solid as shown in Figure 6 by omitting the switch 27. Figure 5 shows the envelope of the radio frequency signals received at the receiver 14. The line synchronizing and blanking pulses 31 and 33 respectively are the same as in Figure 3. The gaps 51 represent the negative-going wide pulse from the generator 15, and the narrow pulses 39 are those transmitted by the transmitter 1. The lateral position of the black line 49 with respect to the stripe 47 indicates the lateral position of the aircraft with respect to the desired flight path.

It will be apparent that the display of Figure 6 may be reversed, presenting the appearance of a white line on a broad black stripe, by reversing the sense of the video modulation as mentioned above. Although the invention has been described as involving the use of a single carrier frequency for both transmitters 1 and 3, as is preferred at present, it will be understood without further illustration that different frequencies may be used, with separate airborne television receivers controlling the display on a single cathode ray tube.

I claim as my invention:

1. In a radio system for guiding mobile craft, a ground station including two spaced equi-directional transmitters; a television camera and synchronizing signal generator means connected to only one of said transmitters; means responsive to line synchronizing signals from said synchronizing signal generator to produce a video signal representing a double-line reference pattern, and means applying said signal to said one of said transmitters together with the video output of said camera; means responsive to said line synchronizing signals to produce a further video signal representing a mark which is distinguishable from said reference pattern, and means applying said further video signal to the other of said transmitters; common television receiver means on one of the craft to be guided, responsive to said ground station transmitters to produce a composite visual display showing both said reference pattern and said mark, said mark being positioned between said double lines of said pattern in said display in accordance with the position of said craft with respect to a predetermined course normal to a line connecting said transmitters.

2. In a radio system for guiding mobile craft, a ground station including two spaced equi-directional transmitters; a television camera and synchronizing signal generator means connected to only one of said transmitters; means responsive to line synchronizing signals from said synchronizing signal generator to produce a video signal representing a pair of vertical lines and means applying said signal to one of said transmitters together with the video output of said camera; means responsive to said line synchronizing signals to produce a further video signal representing a third vertical line which is distinguishable from said first mentioned lines, and means applying said further video signal to the other of said transmitters; common television receiver means on one of the craft to be guided, responsive to both of said ground station transmitters to produce a visual display showing all of said vertical lines, said third line being positioned between said first mentioned pair of lines in said display in accordance with the position of said craft with respect to a predetermined course normal to a line connecting said transmitters.

3. In a radio system for guiding mobile craft, a ground station including two spaced equi-directional transmitters; a television camera and synchronizing signal generator means connected to only one of said transmitters; means responsive to line synchronizing signals from said synchronizing signal generator to produce a video signal representing a pair of vertical lines, and means applying said signal to one of said transmitters together with the video output of said camera; means responsive to said line synchronizing signals to produce a further video signal representing a third vertical line which is distinguishable from said first mentioned lines, and means applying said further video signals to the other of said transmitters; common television receiver means on one of the craft to be guided, responsive to both of said ground station transmitters to produce a visual display showing all of said vertical lines, said third line being positioned with respect to said first mentioned pair of lines in said display in accordance wth the position of said craft with respect to a predetermined course normal to a line connecting said transmitters.

DAVID G. C. LUCK.

REFERENCES CITED

The following references are of record in the file of this patent:

UNITED STATES PATENTS

| Number | Name | Date |
|---|---|---|
| 2,070,651 | Dowsett | Feb. 16, 1937 |
| 2,150,551 | Kemp | Mar. 14, 1939 |
| 2,226,860 | Grieg | Dec. 31, 1940 |
| 2,267,715 | Bowen | Dec. 30, 1941 |
| 2,284,873 | Kemp | June 2, 1942 |
| 2,298,476 | Goldsmith | Oct. 13, 1942 |
| 2,307,029 | Elm | Jan. 5, 1943 |
| 2,399,671 | Gage | May 7, 1946 |
| 2,428,427 | Loughren | Oct. 7, 1947 |
| 2,428,966 | Gage | Oct. 14, 1947 |
| 2,480,068 | Wolff | Aug. 23, 1949 |
| 2,481,410 | Goldsmith | Sept. 6, 1949 |
| 2,490,268 | Herbst | Dec. 6, 1949 |

OTHER REFERENCES

Teleran Proposal, Electronics, vol. 19, No. 2, pages 124–127.